(12) United States Patent
Muralidharan (10) Patent No.: US 10,044,318 B2
(45) Date of Patent: Aug. 7, 2018

(54) CLEAN ENERGY GENERATION, STORAGE, AND DISTRIBUTION SOLAR SHADE DEVICE AND METHOD OF USE THEREOF

(71) Applicant: Francis N. Muralidharan, Encino, CA (US)

(72) Inventor: Francis N. Muralidharan, Encino, CA (US)

(*) Notice: Subject to any disclaimer, the term of this patent is extended or adjusted under 35 U.S.C. 154(b) by 68 days.

(21) Appl. No.: 15/253,994

(22) Filed: Sep. 1, 2016

(65) Prior Publication Data

US 2018/0062558 A1    Mar. 1, 2018

Related U.S. Application Data

(60) Provisional application No. 62/241,486, filed on Oct. 14, 2015.

(51) Int. Cl.
| | |
|---|---|
| *H02S 10/40* | (2014.01) |
| *H02S 20/30* | (2014.01) |
| *H02S 40/38* | (2014.01) |
| *H02S 20/20* | (2014.01) |
| *H02S 40/30* | (2014.01) |
| *H02J 7/02* | (2016.01) |
| *H02J 7/35* | (2006.01) |

(52) U.S. Cl.
CPC .............. *H02S 10/40* (2014.12); *H02J 7/025* (2013.01); *H02J 7/35* (2013.01); *H02S 20/20* (2014.12); *H02S 20/30* (2014.12); *H02S 40/30* (2014.12)

(58) Field of Classification Search
CPC .......... H02S 10/40; H02S 20/20; H02S 20/30; H02S 40/30; H02S 40/38; H02J 7/025; H02J 7/35
USPC .................................. 307/9.1, 10.1
See application file for complete search history.

(56) References Cited

U.S. PATENT DOCUMENTS 9,789,949 B2 * 10/2017 Hontz ................... B64D 47/00
2017/0342771 A1 * 11/2017 Piekny ..................... E06B 9/42

* cited by examiner

Primary Examiner — Hal Kaplan
(74) Attorney, Agent, or Firm — Richard J. Hepner (57) ABSTRACT

A solar shade-energy device comprising a solar shade having a photovoltaic solar panel and a support structure; a means of mounting said solar shade; an energy storage-distribution module having a housing, an energy storage device, power conditioning circuitry, and one-or-more energy distribution ports; a means of detachably mounting said energy storage-distribution module onto said solar shade; and a disconnectable electrical interface means between said energy storage-distribution module and said photovoltaic solar panel is disclosed. A method of using said solar shade-energy device is also disclosed.

6 Claims, 7 Drawing Sheets

CLEAN ENERGY GENERATION, STORAGE, AND DISTRIBUTION SOLAR SHADE DEVICE AND METHOD OF USE THEREOF

CROSS-REFERENCE TO RELATED APPLICATION

This application claims the benefit of U.S. Provisional Application No. 62/241,486, filed Oct. 14, 2015.

FIELD OF THE INVENTION

The present invention relates generally to the field of solar shades. More particularly, the present invention provides a useful and novel apparatus for providing shade from the sun, especially usefully for the interior of a vehicle or building, while converting the incident solar energy into electrical energy, and storing the generated electrical energy. The invention further provides a useful and novel apparatus for distributing the stored energy to electrically-powered devices. A method of using the device is also disclosed.

BACKGROUND OF THE INVENTION

Unless specifically indicated otherwise, the materials described in this section are not prior art to the claims in this application, and are not admitted to be prior art by inclusion in this section.

The material in this patent document is subject to copyright protection under the copyright laws of the United States and other countries. The copyright owner grants a limited license to any member of the public to reproduce the patent document as it appears in official governmental records. All other copyrights rights are reserved.

One set of problems addressed by the present invention are the harmful effects of solar radiation. These include deterioration and fading of materials, heat, glare, and burns and damage to skin due to ultraviolet radiation. This problem has been addressed by conventional solar shade devices. However, a significant limitation and disadvantage of typical conventional solar shade devices is that they do not make use of the free, clean solar energy. Rather, they dissipate the incident solar energy in the form of harmful heat and glare. U.S. Pat. No. 4,775,180 to Phillips discloses an example of a conventional vehicle solar shade. The solar shade of Phillips mounts in the vehicle interior, and has a solar reflective coating on the outside facing portion of the shade. Using the solar shade of Phillips results in both the waste of the solar energy, and the dissipation of the solar energy in the form of glare and heat released into the vehicle.

Others with skill in the related arts have recognized and addressed the noted limitations and disadvantages inherent to conventional solar shades, with limited practical success. U.S. Pat. No. 6,762,582 to Kirkpatrick discloses a system for and method of powering an electric-powered device associated with a vehicle. However, while Kirkpatrick does attempt to make use of the available free and clean solar energy, the system of Kirkpatrick has its own severe limitations and disadvantages. The system of Kirkpatrick relies upon vehicle battery power and the vehicle's existing power distribution system. As a result, the system of Kirkpatrick is complex, difficult to install, and use is limited to devices that may be directly, physically, electrically connected to the vehicle's power distribution system. The system of Kirkpatrick cannot function remotely and independent of the vehicle's power distribution system, either inside or outside of the vehicle.

As is readily apparent from a review of conventional solar shade designs, what is needed is a clean energy generation, storage, and distribution solar shade device, and a method of use thereof, that protects vehicles and buildings, and their occupants, from the adverse effects of solar radiation, while at the same time providing a simple and versatile means of generating, storing and distributing electrical energy from incident solar radiation.

SUMMARY OF THE INVENTION

In view of the foregoing limitations and disadvantages inherent to the conventional apparatus in the related art, the present invention provides a useful and novel apparatus [hereinafter "solar shade-energy device"] for shading the interior of a vehicle or a building from incident solar radiation energy, converting the incident solar radiation energy into electrical energy, storing the generated electrical energy, and distributing the stored electrical energy to electronic devices. A method of using the solar shade-energy device is disclosed.

A principal object of the present invention is to provide protection to the interior of a vehicle or building, and/or to persons within a vehicle or building, from the adverse impacts of incident solar radiation, such as deterioration and fading of materials, heat, glare, and burns and damage to skin due to ultraviolet radiation.

In one aspect, the present invention provides a solar shade-energy device having a solar shade.

Another principal object of the present invention is to provide a means of capturing and making productive use of the clean energy from the sun by generating and storing electrical energy, and distributing the stored electrical energy to electrically-powered devices.

In one aspect, the present invention provides a solar shade-energy device comprising a solar shade having a photovoltaic solar panel and a support structure; an energy storage-distribution module having a housing, an energy storage device, power conditioning circuitry, and one-or-more energy distribution ports; a means of detachably mounting the energy storage-distribution module onto the solar shade; and a disconnectable electrical interface means between the energy storage-distribution module and the solar shade.

A further object of the present invention is to provide a device that is portable and convenient to use to distribute stored electrical energy to electrically-powered devices located anywhere internal or external to the vehicle or building; that may function independently of any external power generation, storage or distribution system of the vehicle or building that the device is installed in; and that may perform its electrical distribution function either while the energy storage device is being charged or with the energy storage device removed and disconnected from the solar shade.

In one aspect, the present invention provides a solar shade-energy device comprising a solar shade having a photovoltaic solar panel and a support structure; an energy storage-distribution module having a housing, an energy storage device, power conditioning circuitry, and one-or-more energy distribution ports; a means of detachably mounting the energy storage-distribution module onto the solar shade; and a disconnectable electrical interface means between the energy storage-distribution module and the solar shade.

Still another object of the present invention is to provide a device that is versatile and adaptable to multiple useful purposes.

In one aspect, the present invention provides a solar shade-energy device comprising an integrated electrically-powered device built into an energy storage-distribution module, the integrated electrically-powered device being any useful device, including but not in a limiting sense, a flashlight, an alarm, flash memory, a flash drive, a projector, a radio, an audio recorder and/or playback device, a camera, a GPS device, a telephone, a portable computing device, a hard drive, solid state drive, a touch and/or gesture based user interface, or augmented and/or virtual reality hardware. In still another aspect, the present invention, the support structure and/or the photovoltaic solar panel may be modular in design in order to allow the solar shade-energy device to be configured to fit a variety of installation locations.

Other objects, aspects and advantages of the present invention will become readily apparent to those with skill in the art from the following figures, descriptions and claims. As will be appreciated by those with skill in the related art, the invention may be implemented in a plurality of equivalent embodiments. Such alternative embodiments, and their attendant objects, aspects and advantages, are within the scope of the present invention and, therefore, the examples set forth herein shall not be limiting.

BRIEF DESCRIPTION OF THE DRAWINGS

The nature of this invention, as well as all its objects, aspects and advantages, will become readily apparent and understood upon reference to the following detailed description when considered in conjunction with the accompanying drawings, in which like reference numerals designate like parts throughout the figures thereof, and wherein.

DETAILED DESCRIPTION OF THE INVENTION

The following description is provided to enable a person skilled in the relevant art to make and use the invention, and sets forth the best modes contemplated by the inventor of carrying out the invention. The present invention shall not be limited to the examples disclosed. Rather, the scope of the invention shall be as broad as the claims will allow.

Various inventive features are described below that may each be used independently of one another or in combination with other features. However, any single inventive feature may not address any of the disadvantages or objects discussed above, or might address only one of the disadvantages or objects discussed above. Further, one or more of the disadvantages or objects discussed above may not be fully addressed by any of the features described below.

Figure 1:
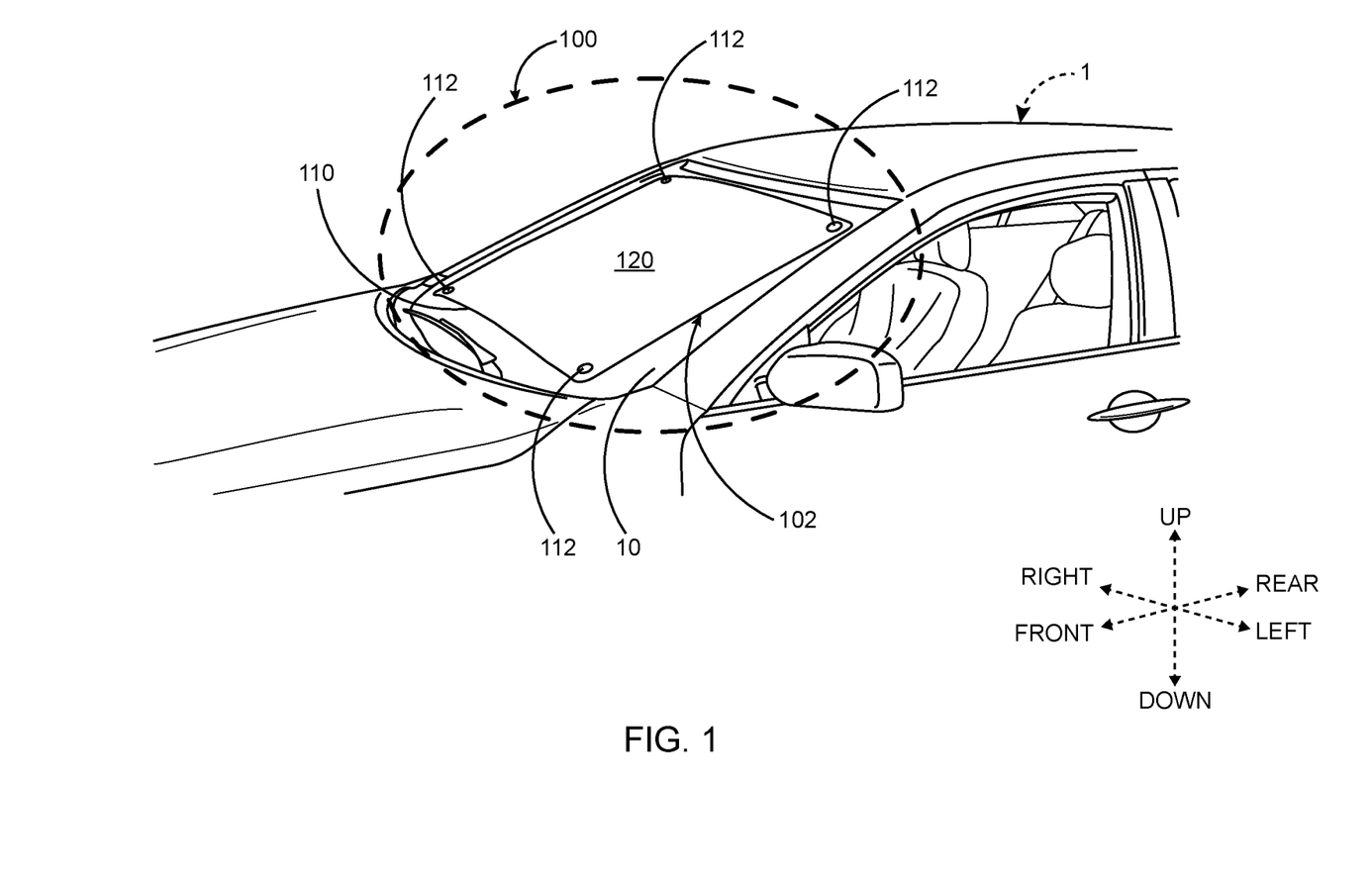
FIG. 1 presents a left-front perspective view of a solar shade-energy device 100 installed in a vehicle 1 according to one exemplary embodiment of the present invention.

NOMENCLATURE AND LISTING OF ELEMENTS 1 vehicle
10 windshield
100 solar shade-energy device
102 window solar shade
104 modular sub-panel
110 support structure
112 suction cup
120 photovoltaic solar panel
130 energy storage-distribution module
132 housing
134 magnets/contacts
136 energy distribution port
138 energy storage device
140 power conditioning circuitry
150 electrically-powered device
160 integrated electrically-powered device
170 inductive charging unit Referring now to the drawings, FIG. 1 presents a left-front perspective view of a solar shade-energy device 100 shown in use according to one exemplary embodiment of the present invention. The solar shade-energy device 100 is shown installed on the interior side of the windshield 10 of a vehicle 1.

The solar shade-energy device 100 may have a window solar shade 102 comprising a support structure 110 and a photovoltaic solar panel 120. The window solar shade 102 may be configured to fit the windshield 10 of the vehicle 1. The support structure 110 may function to provide structural integrity to the solar shade-energy device 100. The support structure 110 may be rigid, flexble and/or foldable in design. The support structure 110 may also function to accommodate the mechanical installation of the solar shade-energy device 100 into the vehicle 1.

The solar shade-energy device 100 may be mounted to the vehicle 1 in any useful and practical manner. For example, the solar shade-energy device 100 may be configured to sit on the dashboard of a vehicle 1 and remain in place without any mechanical attachment means. Alternatively, the solar shade-energy device 100 may employ a mechanical means of mounting to the vehicle 1 and/or the windshield 10. In the one preferred embodiment of the present invention shown in FIG. 1, the solar shade-energy device 100 may be mounted to the windshield 10 by means of suction cups 112. In other embodiments of the present example, alternative mounting means may be employed, for example, but not in a limiting sense, hook-and-loop fasteners.

A photovoltaic solar panel 120 may form and/or may be mounted to the front face of the support structure 110. The photovoltaic solar panel 120 may comprise one-or-more solar cells (not shown) that convert solar energy into electrical energy that may be used to power equipment or to charge a battery.

Figure 2:
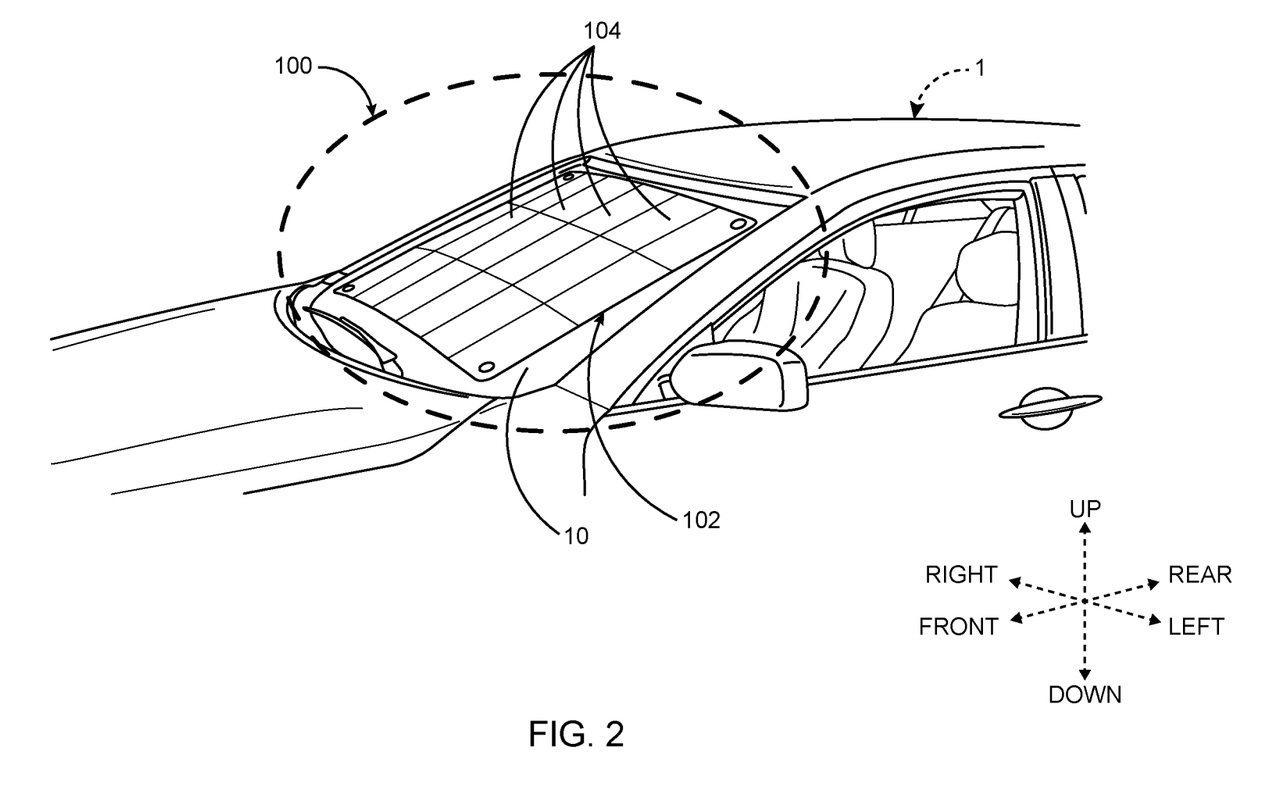
FIG. 2 presents a left-front perspective view of the solar shade energy-device 100 of FIG. 1 wherein the window solar shade 102 is of a modular design.

FIG. 2 presents a left-front perspective view of the solar shade energy-device 100 of FIG. 1 wherein the window solar shade 102 is of a modular design. The support structure 110 and/or the photovoltaic solar panel 120 may be modular in design in order to allow the solar shade-energy device 100 to be configured to fit a variety of installation locations. In the exemplary embodiment of the present invention shown in FIG. 2, the window solar shade 102 is comprised of a plurality of modular sub-panels 104.

In alternative embodiments of the present invention, the solar cells may be made of any useful materials, including but not in a limiting sense, silicon, graphene, carbon nanotubes (CNTs), phosphorene, Perovskite, or quantum dots.

In alternative embodiments of the present invention, the one-or-more solar cells may be replaced with devices employing other energy generation technologies, including but not in a limiting sense, biological photovoltaics, artificial photosynthesis, or biohybrid solar cells. It is within the contemplation of the present invention that any clean energy generation technology, whether presently known, currently in development, or to be developed in the future, may be usefully adapted for use in the present invention.

In an alternative embodiment of the present invention, the photovoltaic solar panel may itself function as the support structure; the photovoltaic function and the structural function therefore being performed by a single component of the device.

In alternative embodiments of the present invention, the solar shade-energy device may be located in any useful and practical location about a vehicle including, but not limited to, the interior side of a rear window, the interior side of a side window, and/or the interior side of a sunroof.

In other alternative embodiments of the present invention, the solar shade-energy device may be located on the exterior side of a windshield, rear window, side window, and/or sunroof.

In still another alternative embodiment of the present invention, the solar shade-energy device may form a component of a car cover.

In another alternative embodiment of the invention, the invention may be adapted for use in or on a building. In this adaptation, the solar shade device may be mounted on the interior or exterior side of a window of the building, similar to a window blind.

Figure 3:
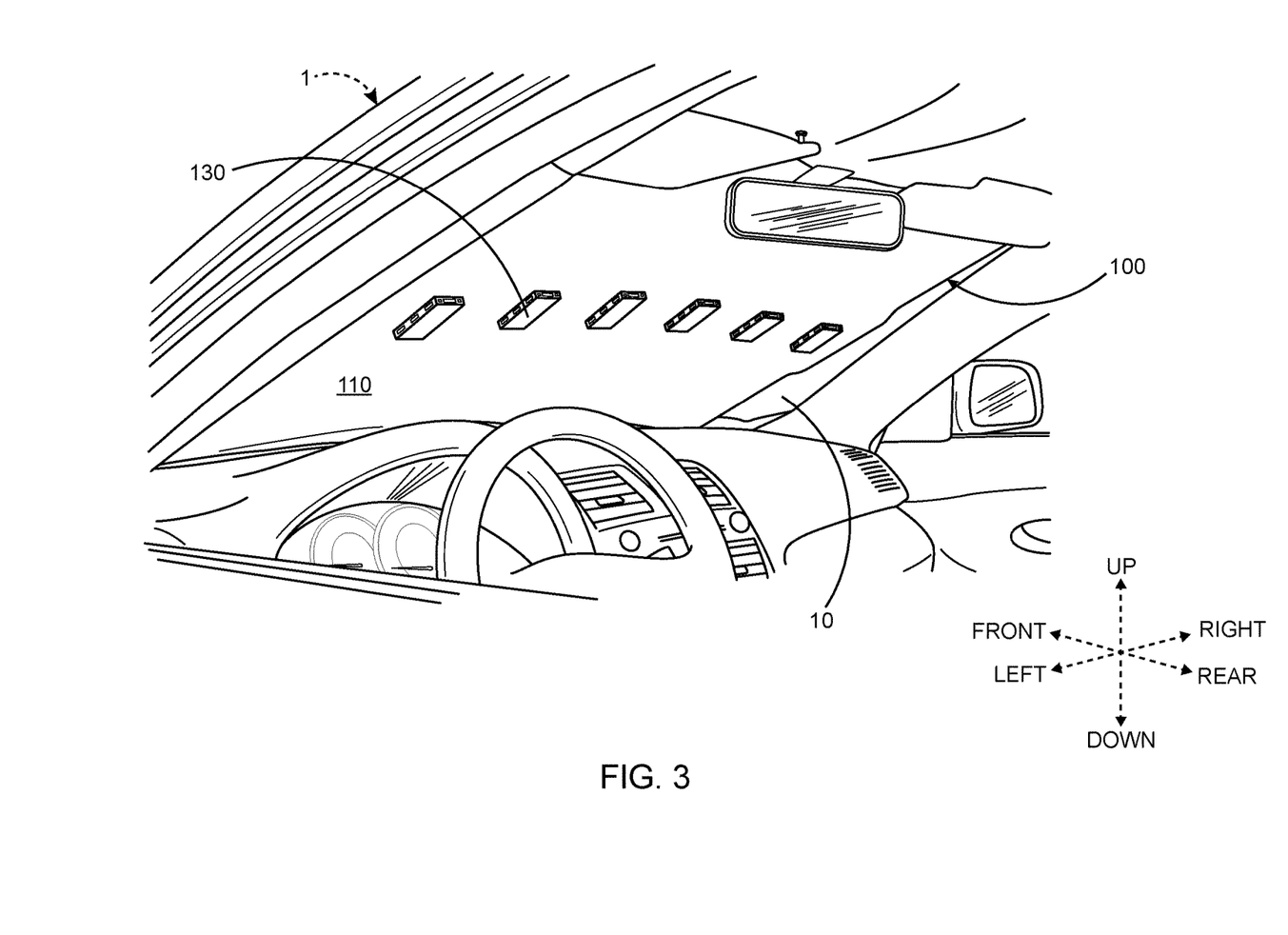
FIG. 3 presents a left-rear perspective view of the solar shade-energy device 100 of FIG. 1.

FIG. 3 presents a left-rear perspective view of the solar shade-energy device 100 of FIG. 1. One or more energy storage-distribution modules 130 may be mounted to the interior side of the support structure 110 of the solar shade-energy device 100.

The energy storage-distribution module 130 may be mechanically mounted to the support structure 110 in any useful and practical manner. For example, but not in a limiting sense, mechanical attachment may be accomplished by means of clips, a tongue-and-groove interface, hook-and-loop fasteners, snaps, bayonet fasteners, twist-snap fasteners, wing nuts, or similar fastening means.

The energy storage-distribution module 130 may be electrically connected to the photovoltaic solar panel 120 by any useful means, including but not in a limiting sense, spring-loaded contacts, post connectors, or similar electrical connection means. In an alternative embodiment of the present invention, energy may be distributed from the photovoltaic solar panel 120 to the energy storage-distribution module 130 by means of wireless electromagnetic induction.

Figure 4:
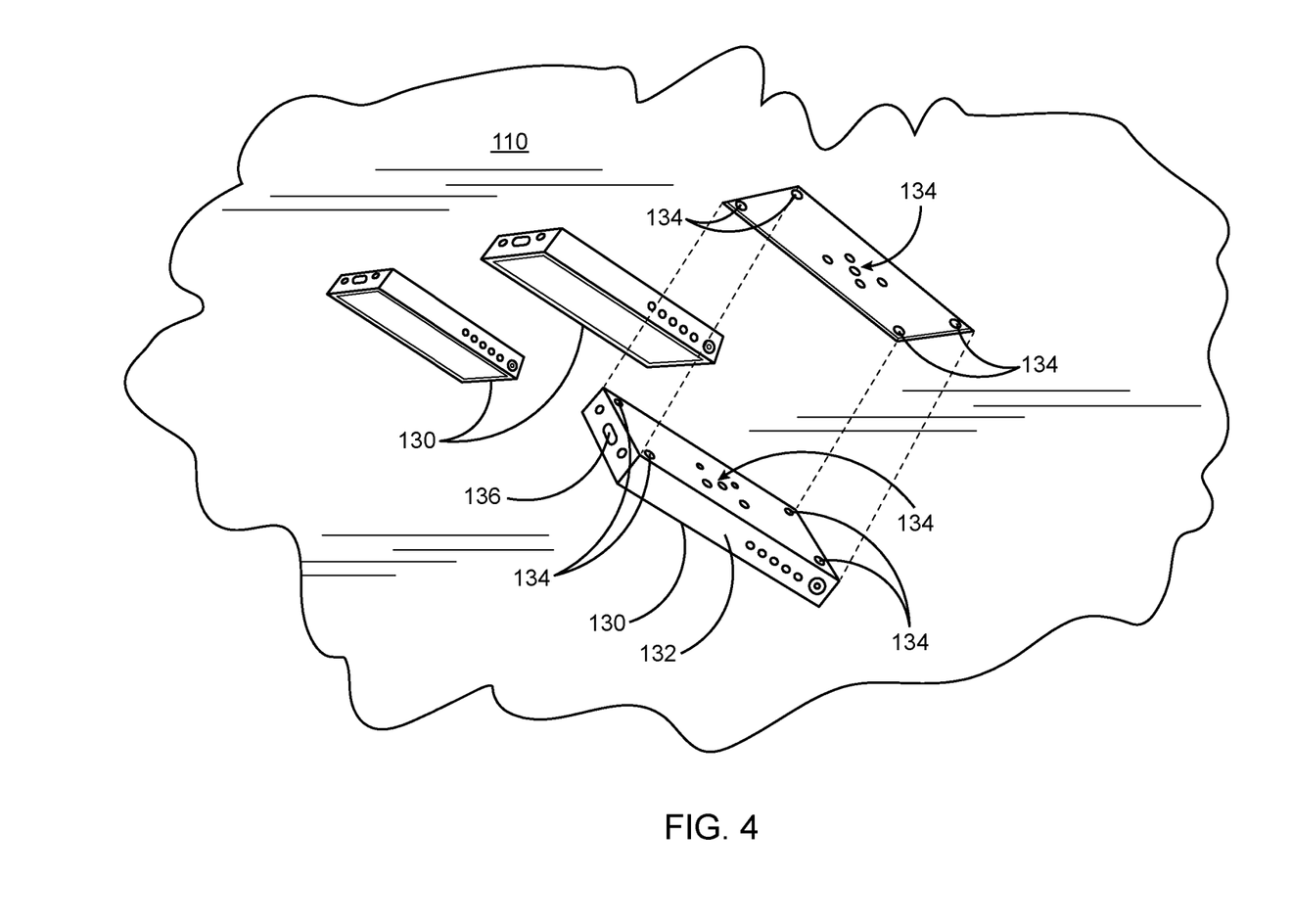
FIG. 4 presents a perspective view of an energy storage-distribution module 130 positioned for installation into the solar shade-energy device 100.
Figure 5:
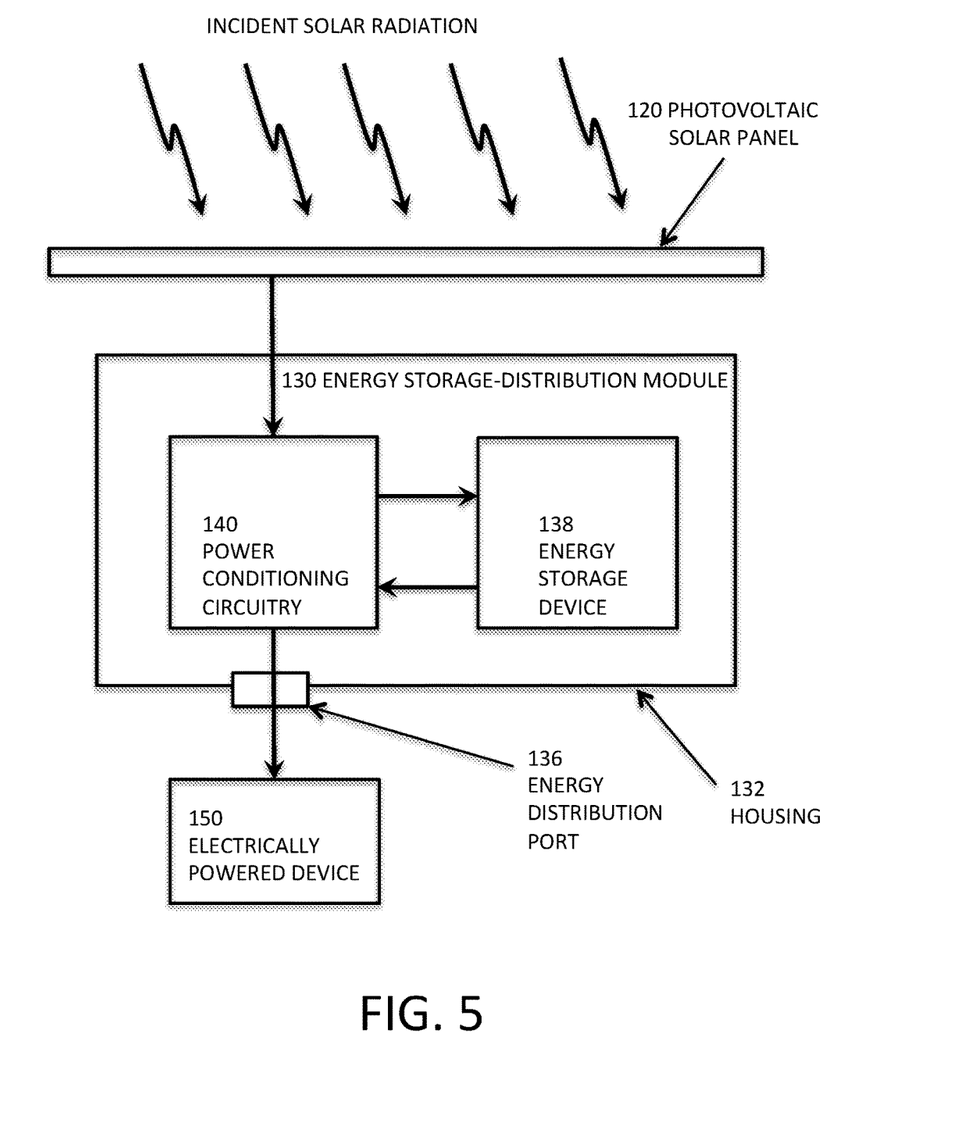
FIG. 5 presents a block interconnect diagram of the solar shade-energy device 100 of FIG. 1.

FIG. 4 presents a perspective view of an energy storage-distribution module 130 positioned for installation into the solar shade-energy device 100. FIG. 5 presents a block interconnect diagram of the solar shade-energy device 100 of FIG. 1.

Referring now to FIG. 4 and FIG. 5, the energy storage-distribution module 130 may comprise a housing 132, a means of attaching the energy storage-distribution module 130 to the support structure 110, an energy storage device 138, one-or-more energy distribution ports 136, and power conditioning circuitry 140.

The energy storage device 138 may be a battery or may employ another energy storage technology such as, but not in a limiting sense, electrical, chemical or electrochemical technology devices, microbial batteries, supercapacitors, ultracapacitors, ultrabatteries, superconducting magnetic energy storage (SMES), or thermal energy storage (TES).

In an alternative embodiment of the present invention, the energy storage-distribution module 130 may incorporate an electromagnetic induction charger to enable wireless charging and/or recharging of electrically-powered devices.

In one preferred embodiment of the present invention, the energy storage-distribution module 130 may be mounted to the support structure 110 by means of mating pairs of magnets/contacts 134; one of each pair being mounted on the support structure 110, the other being mounted on the housing 132 of the energy storage-distribution module 130. In this preferred embodiment, the mating pairs of magnets/contacts 134 may also perform the function of providing electrical connectivity between the photovoltaic solar panel 120 and the energy storage-distribution module 130. It is an object of this preferred embodiment to enable a user to install and/or remove an energy storage-distribution module 130 quickly and conveniently, without the need for tools, wires, or electrical disconnections.

The power conditioning circuitry 140 may be designed and configured to deliver an electrical voltage of the proper level and characteristics to enable various electrically-powered devices 150 to function properly.

The one-or-more energy distribution ports 136 may be of any useful energy distribution technology, including but not in a limiting sense, USB sockets, coaxial power connectors, snap and lock DC power connectors, or socket and plug connectors.

Figure 6:
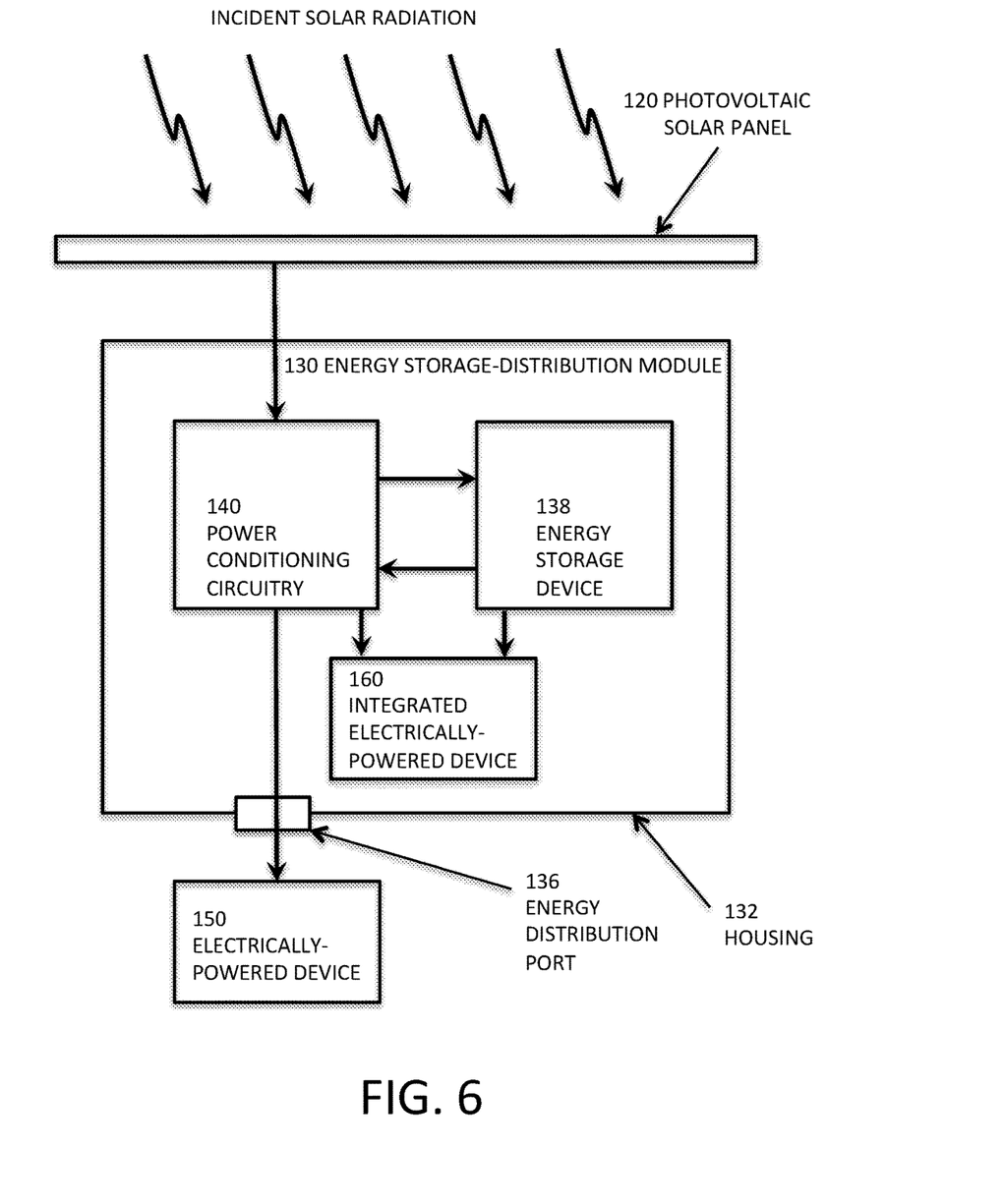
FIG. 6 presents a block interconnect diagram of the solar shade-energy device 100 of FIG. 1 further comprising an integrated electrically-powered device 160.

FIG. 6 presents a block interconnect diagram of the solar shade-energy device 100 of FIG. 1 further comprising an integrated electrically-powered device 160 built into the energy storage-distribution module 130. The integrated electrically-powered device may be any device that may be usefully integrated and used in the energy storage-distribution module 130, including but not in a limiting sense, a flashlight, an alarm, flash memory, a flash drive, a projector, a radio, an audio recorder and/or playback device, a camera, a GPS device, a telephone, a portable computing device, a hard drive, solid state drive, a touch and/or gesture based user interface, or augmented and/or virtual reality hardware.

In alternative embodiments of the present invention, the integrated electrically-powered device 160 may be a device to record and/or display data pertaining to the performance of the solar shade-energy device, including but not in a limiting sense, energy generation data or data associated with the level of charge in the energy storage device. In still another embodiment, the integrated electrically-powered device 160 may include a means of communicating data and/or commands to and/or from a mobile computing device such as a smart phone or tablet computer.

Figure 7:
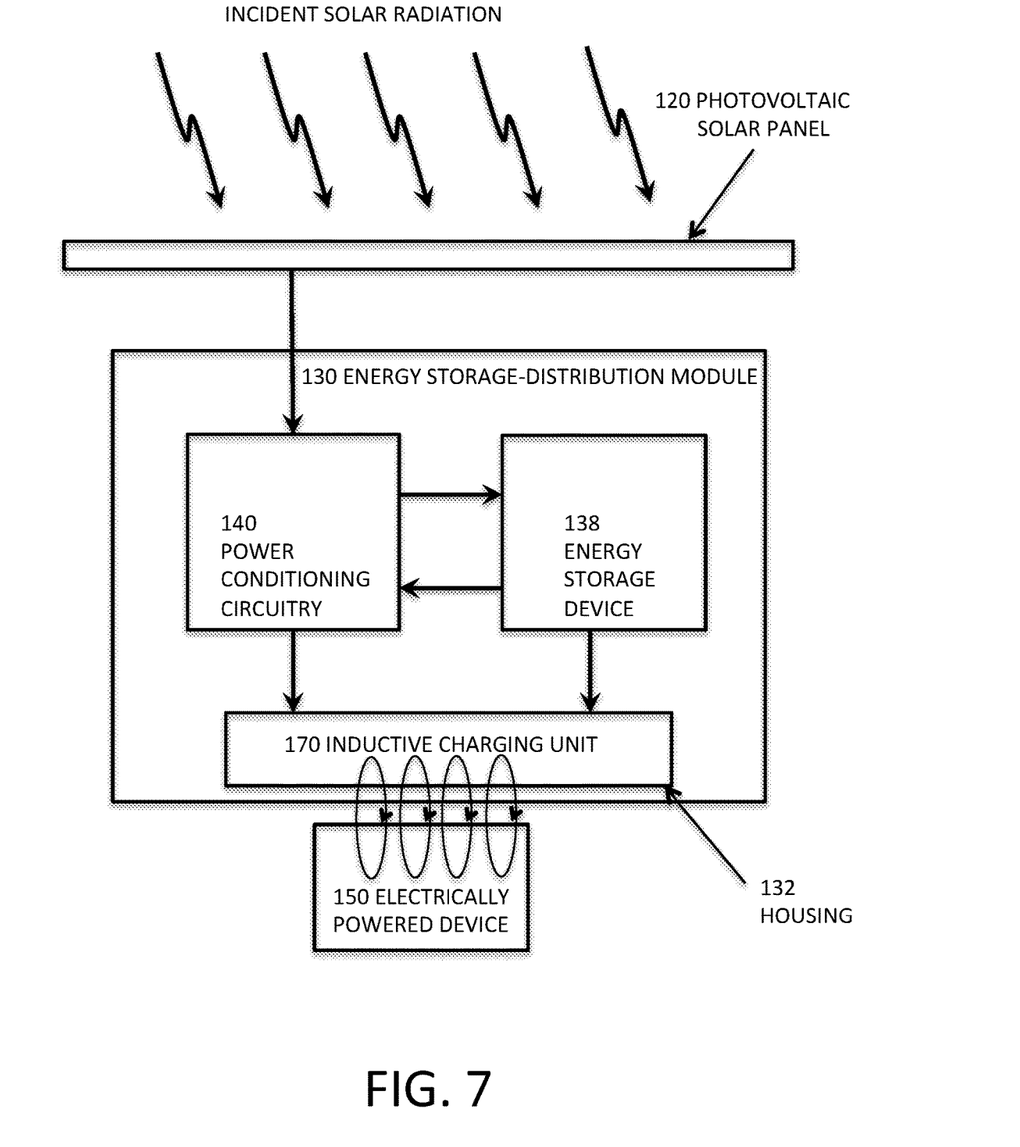
FIG. 7 presents a block interconnect diagram of the solar shade-energy device 100 of FIG. 1 further comprising an inductive charging unit 170.

FIG. 7 presents a block interconnect diagram of the solar shade-energy device 100 of FIG. 1 further comprising an inductive charging unit 170. The inductive charging unit 170 may enable wireless charging of an electrically-powered device 150.

A method of shading the interior of a vehicle or building from incident solar radiation energy, converting said incident solar radiation energy into electrical energy, storing said electrical energy, and distributing said electrical energy to an electrically-powered device, may comprise the following steps:

1. Providing a solar shade-energy device, comprising:
   a window solar shade having
      a photovoltaic solar panel having one or more solar cells; and
      a support structure;
   a means of mounting the window solar shade into a vehicle or building;
   an energy storage-distribution module having a housing, an energy storage device, power conditioning circuitry, and one-or-more energy distribution ports,
   a means of detachably mounting the energy storage-distribution module onto the window solar shade; and
   a disconnectable electrical interface means between the energy storage-distribution module and the solar shade;
2. Mounting the solar shade-energy device on the interior or exterior of a vehicle or a building such that solar radiation is incident upon the photovoltaic solar panel;
3. Storing electrical energy generated by the photovoltaic solar panel in the energy storage device;
4. Detaching the energy storage-distribution module from the solar shade-energy device;
5. Transporting the detached energy storage-distribution module proximal to an electrically-powered device;
6. Electrically connecting the energy storage-distribution module to the electrically-powered device by means of one of the one-or-more energy distribution ports; and
7. Charging and/or powering the electrically-powered device.

In another preferred embodiment of the present invention, the above-described method of distributing electrical energy to an electrically-powered device, may comprise the following steps:

1. Providing a solar shade-energy device having an energy storage-distribution module further comprising an inductive charging unit; and
2. Charging the electrically-powered device by means of the inductive charging unit.

As will be appreciated by those with skill in the related arts, the elements of the present invention may be modified, interchanged, separated or combined, or additional elements added without departing from the spirit of the invention. Similarly, the steps of the disclosed method may be modified, interchanged, separated or combined, or additional steps added without departing from the spirit of the invention. The invention may be practiced in alternative embodiments other than those illustrated in the Figures. Such modifications, combinations, additions and alternatives are within the contemplation of the present invention. The exemplary embodiments and disclosed are not intended to limit the scope of this invention. Accordingly, the scope of the invention should be determined not by the embodiments illustrated, but by their legal equivalents, and shall be as broad as the claims will allow.

What is claimed is:

1. A solar shade-energy device, comprising:
   a solar shade having
      a photovoltaic solar panel having one or more solar cells; and
      a support structure;
   a means of mounting said solar shade;
   an energy storage-distribution module having a housing, an energy storage device, power conditioning circuitry, and one or more energy distribution ports,
   a means of detachably mounting said energy storage-distribution module onto said solar shade; and
   a disconnectable electrical interface means between said energy storage-distribution module and said solar shade.

2. The solar shade-energy device of claim 1, wherein the photovoltaic solar panel and the support structure are combined into a single element.

3. The solar shade-energy device of claim 1, wherein said solar shade is of a modular design.

4. The solar shade-energy device of claim 1, further comprising an integrated electrically-powered device.

5. The solar shade-energy device of claim 1, wherein said energy storage-distribution module has an electromagnetic induction charger.

6. A method of shading the interior of a vehicle or a building from incident solar radiation energy, converting said incident solar radiation energy into electrical energy, storing said electrical energy, and distributing said electrical energy to an electrically-powered device, comprising:
   (a) Providing a solar shade-energy device, comprising:
      a solar shade having
         a photovoltaic solar panel having one or more solar cells; and
         a support structure;
      a means of mounting said solar shade;
      an energy storage-distribution module having a housing, an energy storage device, power conditioning circuitry, and one or more energy distribution ports,
      a means of detachably mounting said energy storage-distribution module onto said solar shade; and
      a disconnectable electrical interface means between said energy storage-distribution module and said solar shade;
   (b) Mounting said solar shade-energy device such that solar radiation is incident upon said photovoltaic solar panel;
   (c) Storing electrical energy generated by said photovoltaic solar panel in said energy storage device;
   (d) Detaching said energy storage-distribution module from said solar shade-energy device;
   (e) Transporting said energy storage-distribution module proximal an electrically-powered device;
   (f) Electrically connecting said energy storage-distribution module to said electrically-powered device by means of one of said one or more energy distribution ports; and
   (g) Charging and/or powering the electrically-powered device.

* * * * *